(12) United States Patent
Rockenschaub et al.

(10) Patent No.: US 9,440,283 B2
(45) Date of Patent: Sep. 13, 2016

(54) METHOD FOR HOT SHAPING A WORKPIECE AND AGENT FOR REDUCING THE HEAT EMISSION

(75) Inventors: Karin Rockenschaub, Trofaiach (AT); Wilfried Marketz, Kirchdorf am Inn (AT)

(73) Assignee: BOEHLER SCHMIEDETECHNIK GmbH & CO. KG, Kapfenberg (AT)

( * ) Notice: Subject to any disclaimer, the term of this patent is extended or adjusted under 35 U.S.C. 154(b) by 820 days.

(21) Appl. No.: 13/600,442

(22) Filed: Aug. 31, 2012

(65) Prior Publication Data

US 2012/0325117 A1   Dec. 27, 2012

Related U.S. Application Data

(63) Continuation of application No. 12/794,233, filed on Jun. 24, 2010, now Pat. No. 8,685,298.

(30) Foreign Application Priority Data

Jun. 5, 2009  (AT) .................................. A 878/2009

(51) Int. Cl.
| | |
|---|---|
| *C21D 1/70* | (2006.01) |
| *B21J 1/06* | (2006.01) |
| *B21B 45/00* | (2006.01) |
| *B21J 3/00* | (2006.01) |
| *C21D 8/02* | (2006.01) |
| *C22F 1/18* | (2006.01) |

(52) U.S. Cl.
CPC .. B21J 1/06 (2013.01); B21J 3/00 (2013.01); C21D 1/70 (2013.01); C21D 8/0284 (2013.01); C22F 1/183 (2013.01); *B21B 45/00* (2013.01); *B21B 45/008* (2013.01); *C21D 2221/00* (2013.01); *Y02P 70/127* (2015.11); *Y10T 29/49982* (2015.01)

(58) Field of Classification Search
CPC .. C21D 1/70; C21D 8/0284; C21D 2221/00; B21J 1/06; C22F 1/183; C22F 1/008; B21B 45/008

See application file for complete search history.

(56) References Cited

U.S. PATENT DOCUMENTS

| | | | |
|---|---|---|---|
| 2,869,227 A | 1/1959 | Bradstreet | |
| 3,338,733 A | 8/1967 | Rowady | |
| 4,332,618 A * | 6/1982 | Ballard | 106/605 |
| 5,076,858 A | 12/1991 | Huang | |
| 6,077,483 A * | 6/2000 | Locker et al. | 422/179 |
| 6,413,578 B1 * | 7/2002 | Stowell et al. | 427/142 |
| 6,444,335 B1 * | 9/2002 | Wang et al. | 428/701 |
| 6,875,464 B2 * | 4/2005 | Ruud et al. | 427/142 |
| 7,993,704 B2 * | 8/2011 | Raybould et al. | 427/255.21 |
| 8,685,298 B2 * | 4/2014 | Rockenschaub et al. | 264/134 |
| 8,758,502 B2 * | 6/2014 | Nienburg et al. | 106/600 |
| 2007/0224411 A1 * | 9/2007 | Hazel et al. | 428/334 |
| 2014/0299712 A1 * | 10/2014 | Waldrop et al. | 244/121 |

FOREIGN PATENT DOCUMENTS

| | | |
|---|---|---|
| DE | 40 16 340 | 5/1997 |
| DE | 100 08 651 | 6/2001 |
| GB | 693114 | 6/1953 |
| JP | 62-137117 | 6/1987 |
| JP | 10-156473 | 6/1998 |

* cited by examiner

*Primary Examiner* — David M Brunsman
(74) *Attorney, Agent, or Firm* — Greenblum & Bernstein, P.L.C.

(57) ABSTRACT

A process for hot shaping a workpiece of metal or an intermetallic compound at a temperature of higher than about 1000° C. The method comprises at least partially coating the surface of the workpiece with a coating agent that comprises an oxide phase and an additive and/or an adhesive before processing the workpiece into a formed body or a rolling product. A coating agent for reducing the heat emission from the workpiece comprises a predominant amount of an oxide phase. This abstract is neither intended to define the invention disclosed in this specification nor intended to limit the scope of the invention in any way.

11 Claims, 2 Drawing Sheets

METHOD FOR HOT SHAPING A WORKPIECE AND AGENT FOR REDUCING THE HEAT EMISSION

CROSS-REFERENCE TO RELATED APPLICATIONS

This application is a divisional of U.S. patent application Ser. No. 12/794,233, filed Jun. 4, 2010, which claims priority under 35 U.S.C. §119 to Austrian Patent Application No. A 878/2009, filed on Jun. 5, 2009, the entire disclosures of each of these applications are expressly incorporated by reference herein.

BACKGROUND OF THE INVENTION

1. Field of the Invention

The present invention relates to a method for hot shaping through solid-blank forming such as forging or rolling a workpiece or raw material of metal or of an intermetallic compound at a temperature of more than about 1000° C. The invention also relates to an agent for a coating to reduce the heat emission from a workpiece or raw material heated to deforming temperature.

2. Discussion of Background Information

With materials with poor deformation properties a hot forming of a workpiece of metal, such as an ingot or primarily formed raw material of metal or of intermetallic compounds to form a forging requires a precise temperature control from heating up to the removal of the part from the forming means.

A sufficient workability of the material of the workpiece is often given only in a narrow temperature window, because lower forming temperatures lead to a brittleness and higher temperatures likewise lead to a brittleness and/or to a coarse grain formation of the microstructure of the workpiece.

As the case may be, the limit of a sufficient workability is at high temperatures above 1000° C.

The emitted thermal energy increases in general with rising temperature to the fourth power so that with high surface temperatures of the workpiece the energy loss and the drop in temperature in the edge area in the unit of time are high.

With necessarily high forming temperatures it is therefore difficult and/or expensive to ensure a temperature with sufficient workability of the material also in the edge area of the workpiece over a necessary period of time.

Workpieces are heated to forming temperature in the usual manner in a furnace. The heated part is subsequently removed from the furnace with known means, conveyed to a shaping means, placed on a table roller or a die part and processed with dies in a forming manner. During this period of time the surface of the workpiece emits heat and/or heat is dissipated into the dies.

The general problem therefore lies in a rapid loss of temperature of the zone of the workpiece close to the surface and an occurrence of defects, such as cracks, resulting therefrom.

To solve this problem it has already been proposed and is also practiced once in a while to transfer the heated workpiece within a short period of time. However, it is usually not possible to position the heating unit and the forming device in immediate vicinity of each other.

Furthermore, an attempt has also already been made to heat the workpiece so much that even with a drop in temperature the surface zone thereof is still in the temperature range of the workability of the material. However, in this manner a coarsening and/or deterioration of the microstructure or center defects can occur.

Methods wherein the workpiece is enclosed in a capsule and is heated and deformed therein are also known. A method of this type can be rewarding with respect to a deformation of a part in a narrow temperature window, but requires a high expenditure.

In terms of process engineering, an isothermal forging of the workpiece is possible and useful in which the dies are heated to a temperature close to the forming temperature. However, a method of this type is extremely complex and expensive.

It would be advantageous to have available a method of the type mentioned at the outset for forming a workpiece, which method overcomes the disadvantages of the known methods.

SUMMARY OF THE INVENTION

The present invention provides a process for hot shaping through solid-blank forming such as forging or rolling a workpiece or raw material of metal or of an intermetallic compound at a temperature of higher than about 1000° C. The process comprises at least partially coating the surface of the workpiece or raw material with a coating agent that comprises an oxide phase and an additive and/or an adhesive; allowing the coating thus applied to solidify; subsequently preheating with through-heating the coated workpiece or raw material to deforming temperature and transferring same to a shaping device; and processing (e.g., forging and/or rolling) the workpiece or raw material with the shaping device into a formed body or a rolling product.

In one aspect of the process, the temperature of the surface of the workpiece or raw material to be coated may be higher than about 100° C. For example, the temperature may be about 200° C.

In another aspect of the process, the workpiece or raw material may be immersed into the coating agent and/or sprayed with the coating agent.

In yet another aspect, the solidified layer thickness of the coating may be greater than about 0.1 mm, for example, from about 0.3 mm to about 3 mm.

The present invention also provides a coating agent for reducing the heat emission from a workpiece or raw material of metal or an intermetallic compound which is heated to deforming temperature. The agent comprises a predominant amount (e.g., more than about 50% by weight) of an oxide phase, one or more additives and one or more liquid components.

In one aspect of the coating agent, the oxide phase thereof may comprise a metal oxide such as zirconium dioxide. For example, the agent may comprise more than about 70% by weight, e.g., from about 80% to about 98% by weight, or from about 90% to about 97% by weight, of zirconium dioxide, based on the total weight of the coating agent.

In another aspect, the coating agent of the present invention may comprise methylcellulose and/or microsilica as additive. For example, the agent may comprise (a) from about 0.1% to about 1% by weight, e.g., from about 0.2% to about 0.7% by weight of methylcellulose and/or (b) from about 1% to about 10% by weight, e.g., from about 2% to about 8% by weight of microsilica, based on the total weight of the agent.

In yet another aspect, the coating agent of the present invention may comprise sodium silicate glass as liquid component. For example, the coating agent may comprise from about 15% to about 65% by weight, e.g., from about 20% to about 60% by weight of sodium silicate glass, based on the total weight of oxide phase and additive(s).

In a still further aspect of the coating agent of the present invention, the grain size of the oxide phase may be from about 1 µm to about 50 µm. For example, the mean grain size of the oxide phase may be about 12.5 µm.

The present invention also provides a process for the hot forming of parts of a gamma-titanium-aluminum base alloy by the process for the hot shaping of a workpiece according to the present invention as set forth above (including the various aspects thereof) wherein a coating agent according to the present invention as set forth above (including the various aspects thereof) is employed.

BRIEF DESCRIPTION OF THE DRAWINGS

The present invention is further described in the detailed description which follows, in reference to the drawings by way of non-limiting examples of exemplary embodiments of the present invention, and wherein.

DETAILED DESCRIPTION OF THE PRESENT INVENTION

Figure 1:
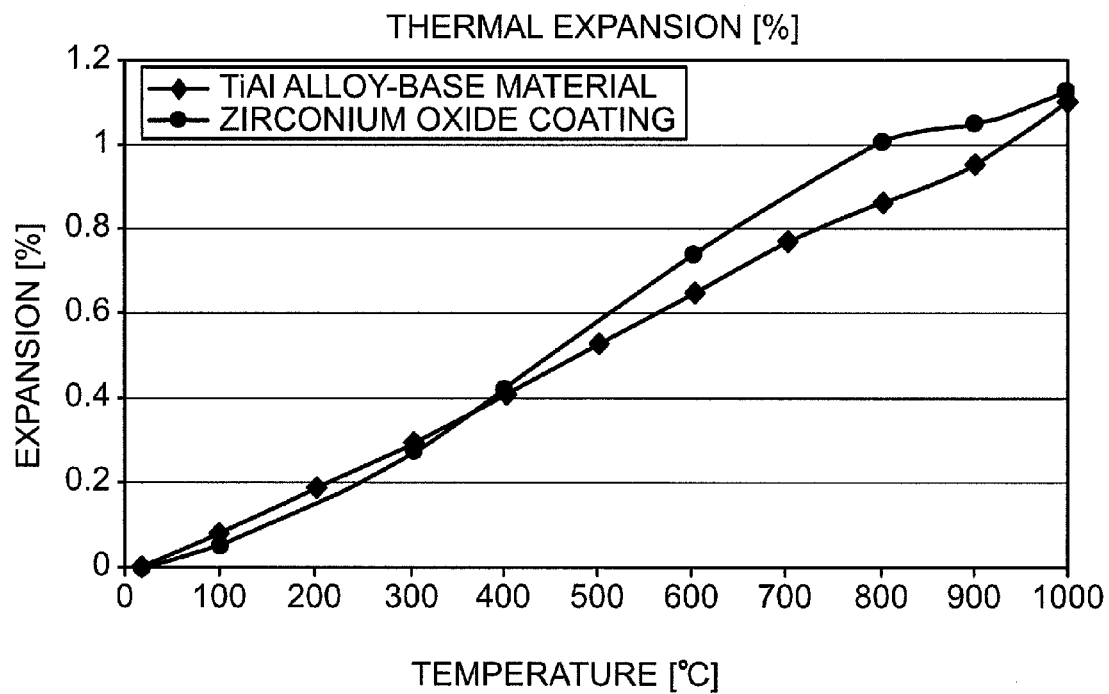
FIG. 1 is graph showing the thermal expansion of a TiAl alloy and a zirconium oxide coating as a function of the temperature.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The advantages achieved with the process according to the present invention include that in particular during the time of transfer of the workpiece to the shaping device the radiation and thus the temperature loss are reduced. This also applies to the placement of the workpiece onto a roller bed or onto a die part. It has been found, surprisingly to one skilled in the art, that a coated workpiece does not require longer heating times during heating in the furnace.

According to the present invention the coating of the workpiece is advantageously carried out with a uniform layer thickness, with substantially no chipping of the layer occurring during heating and during the subsequent transfer to the shaping means. The coating also reduces the heat transfer from the workpiece into the die at least during the first forming step.

A particularly good adhesion of the layer can be achieved according to the invention if the coating of the surface of the workpiece or raw material is carried out at a temperature of the same of more than about 100° C., preferably at approximately 200° C.

If, as was found, a coating of the surface of the workpiece or raw material is carried out by immersion into or spraying with a coating agent, a largely uniform layer thickness can advantageously be achieved on the surface.

In order to achieve an optimum for a reduction of the radiation of thermal energy from the surface and good layer adhesion on the one hand and a desired high surface quality of the formed workpiece on the other hand, it can be advantageously if the coating is carried out with a solidified layer thickness of greater than about 0.1 mm, preferably with a layer thickness of from about 0.3 mm to about 3 mm.

The agent for a coating for reducing the heat emission from a workpiece or raw material heated to deformation temperature, can be easily applied in a thin layer and with a uniform layer thickness on the surface of a workpiece before the heating, will not significantly flake off during the heating process in the furnace, has a sufficient adhesion during the transfer to the die up to the first forming step and improves the quality of the forging.

According to the invention, the oxide phase of the coating agent acts as a heat-resistant insulating component, wherein one or more additives or adhesives which are present in smaller proportions bind the oxide grains and hold them on the substrate. The one or more liquid components serve to homogenize the phases and adjust a desired degree of liquidity for the homogenous application onto the surface of the workpiece or part.

An agent in which the main component or oxide phase is formed of zirconium oxide with a proportion in % by weight of greater than about 70, preferably from about 80 to about 98, in particular from about 90 to about 97, has proven to be particularly advantageous with respect to a major reduction of the heat emission.

Particularly if the proportion of zirconium dioxide is greater than about 70% by weight, an agent in which the additives methyl cellulose and/or microsilica are present in proportions in % by weight of from about 0.1 to 1, preferably from about 0.2 to about 0.7, and from about 1 to about 10, preferably from about 2 to about 8, respectively, can be used particularly advantageously for a coating of TiAl alloys, because this type of alloy and the coating material have coefficients of expansion that differ only slightly from one another.

As a liquid component, sodium silicate glass with a proportion in % by weight of from about 15 to about 65, preferably from about 20 to about 60 may be added to the agent, wherein this addition relates to the oxide phase with the additive(s).

An agent in which the oxide phase shows a grain diameter of from about 1 µm to about 50 µm, preferably an average grain size of $d_{50}$=about 12.5 µm, has proven to be particularly uniformly applicable, adhesive and effective with respect to thermal insulation.

As mentioned above with respect to thermal expansion, the use of the above-mentioned process for hot shaping a workpiece and the use of an agent according to the above specification for reducing heat emission from a workpiece heated to deforming temperature for the hot forming of parts of a gamma-titanium-aluminum-based alloy has proven to be particularly advantageous, wherein a heating of this alloy to more than about 1280° C. can be undertaken and the substantially flawless coating causes a considerable reduction of the temperature drop of the zone close to the surface of the workpiece.

The invention is described in more detail based on results from the development work and from the comparative tests of the course of the temperature over time on test pieces.

FIG. 1 shows the expansion of a substrate of a gamma-titanium-aluminum based alloy and a zirconium coating as a function of the temperature up to 1000° C. Based on the figure it should be noted that the thermal expansions of the two materials show only slight differences, which is the reason for the substantial avoidance of a chipping of the layer from the base material.

Figure 2:
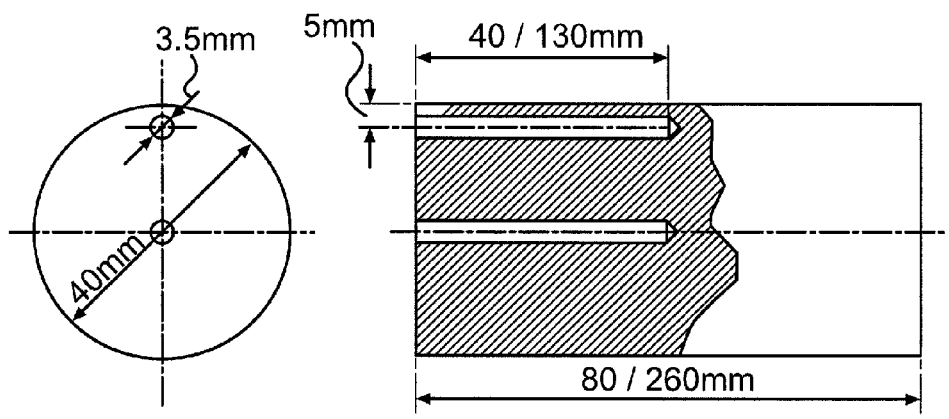
FIG. 2 shows a specimen with the positions of the measuring points.

FIG. 2 shows a specimen with a diameter of 40 mm Ø, which has a bore close to the surface and a center bore for thermal elements.

The tests were carried out such that uncoated and coated specimen were equipped with thermal elements and heated to a temperature of approximately 1290° C. After a through-heating the specimen were removed from the inert gas furnace, positioned on a fire-proof base, and the course of the temperature was measured as a function of the time.

Figure 3:
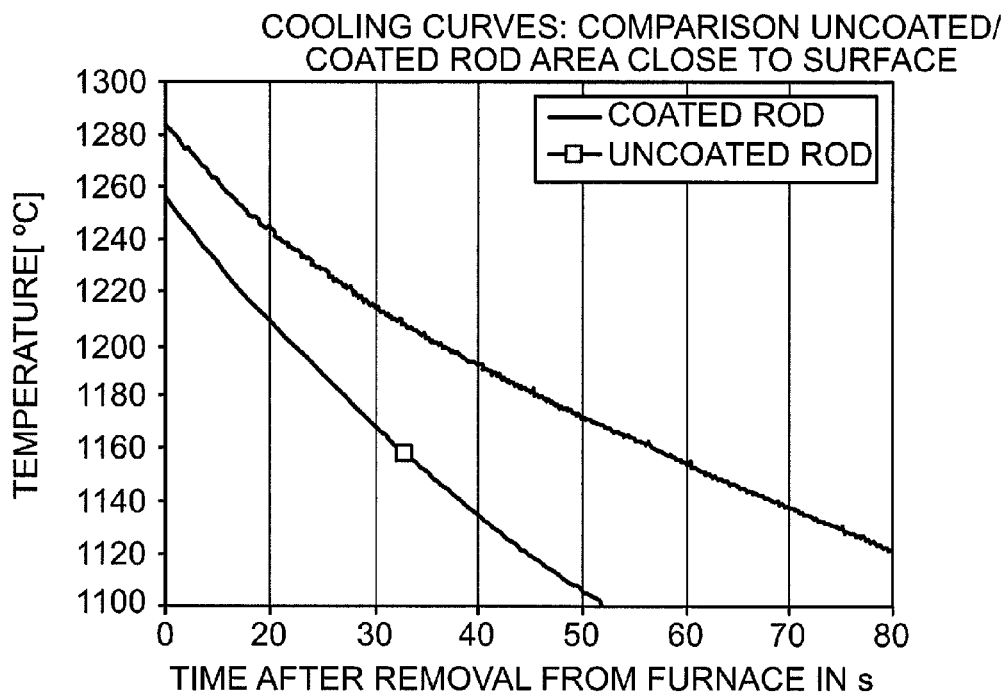
FIG. 3 is a graph showing cooling curves as a function of the time of a coated rod and a bare (uncoated) rod close to the surfaces thereof.

FIG. 3 shows the temperature drop as a function of the time in the zone close to the surface of uncoated and coated specimen. Approx. 30 seconds after the removal of the specimen an uncoated rod shows a temperature in the surface area of approx. 1165° C. and a rod provided with a zirconium dioxide layer shows a temperature of approx. 1215° C.

Figure 4:
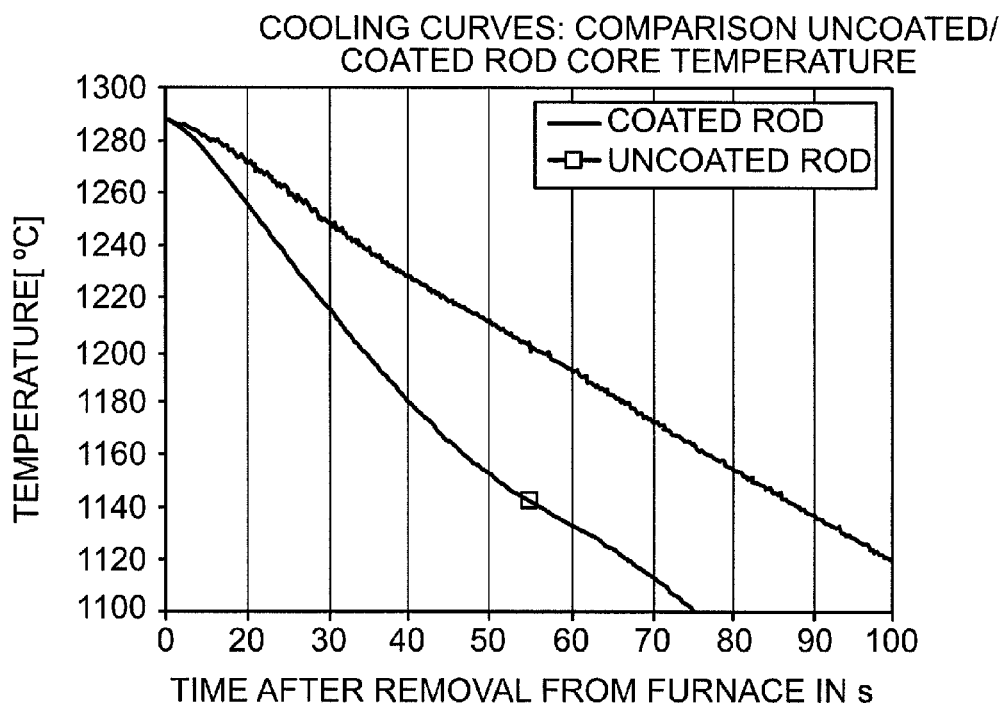
FIG. 4 is a graph showing cooling curves as a function of the time of a coated rod and a bare rod of the rod cores.

FIG. 4 shows the temperature drop in the centers of the specimen.

FIG. 3 and FIG. 4 do not require further explanation for one skilled in the art and clearly show a heat emission reducing effect of a zirconium oxide-based coating on a specimen of a gamma-titanium-aluminum-based alloy.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A coating agent for reducing the heat emission from a workpiece or raw material of metal or of an intermetallic compound which is heated to deforming temperature comprising:
    a predominant amount of an oxide phase comprising a metal oxide that comprises zirconium dioxide, one or more additives, and one or more liquid components, wherein
    the agent comprises from about 15% to about 65% by weight of sodium silicate glass as one of the one or more liquid components, based on a total weight of the oxide phase and the one or more additives, and wherein
    the agent comprises at least one of methylcellulose and microsilica as the one or more additives.

2. A coating agent for reducing the heat emission from a workpiece or raw material of metal or of an intermetallic compound which is heated to deforming temperature comprising:
    a predominant amount of an oxide phase comprising a metal oxide that comprises zirconium dioxide, one or more additives, and one or more liquid components, wherein
    the agent comprises from about 15% to about 65% by weight of sodium silicate glass as one of the one or more liquid components, based on a total weight of the oxide phase and the one or more additives, and wherein
    a grain size of the oxide phase is from about 1 μm to about 50 μm.

3. A coating agent for reducing the heat emission from a workpiece or raw material of metal or of an intermetallic compound which is heated to deforming temperature comprising:
    a predominant amount of an oxide phase comprising a metal oxide that comprises zirconium dioxide, one or more additives, and one or more liquid components, wherein
    the agent comprises at least about 15% by weight of sodium silicate glass as one of the one or more liquid components, based on a total weight of the oxide phase and the one or more additives, and wherein
    the agent comprises more than about 70% by weight of zirconium dioxide, based on a total weight of the coating agent.

4. The coating agent of claim 3, wherein the agent comprises at least about 20% by weight of sodium silicate glass.

5. The coating agent of claim 3, wherein from about 80% to about 98% by weight of zirconium oxide are present.

6. The coating agent of claim 5, wherein from about 90% to about 97% by weight of zirconium oxide are present.

7. The coating agent of claim 3, wherein the agent comprises at least one of methylcellulose and microsilica as the one or more additives.

8. The coating agent of claim 7, wherein the agent comprises at least one of (a) from about 0.1% to about 1% by weight of methylcellulose and (b) from about 1% to about 10% by weight of microsilica, based on a total weight of the agent.

9. The coating agent of claim 8, wherein the agent comprises at least one of (a) from about 0.2% to about 0.7% by weight of methylcellulose and (b) from about 2% to about 8% by weight of microsilica.

10. The coating agent of claim 3, wherein a grain size of the oxide phase is from about 1 μm to about 50 μm.

11. The coating agent of claim 10, wherein a mean grain size of the oxide phase is about 12.5 μm.

* * * * *